United States Patent [19]
Vernet et al.

[11] Patent Number: 5,246,323
[45] Date of Patent: Sep. 21, 1993

[54] PIN FOR FIXING A PIECE TO A THIN SUPPORTING WALL

[75] Inventors: Franck Vernet; Jean-Paul Barthomeuf, both of Bourg de Peage, France

[73] Assignee: Societe de Prospection et d'Inventions Techniques (S.P.I.T.), Bourg-les-Valence, Cedex, France

[21] Appl. No.: 961,983

[22] Filed: Oct. 16, 1992

[30] Foreign Application Priority Data

Oct. 16, 1991 [FR] France .................. 91 12753

[51] Int. Cl.⁵ .................. F16B 13/04; F16B 13/06
[52] U.S. Cl. .................. 411/29; 411/55; 411/59; 411/183
[58] Field of Search .................. 411/29, 34, 36, 37, 411/38, 55, 59, 183, 387

[56] References Cited

U.S. PATENT DOCUMENTS

| | | |
|---|---|---|
| 2,918,841 | 12/1959 | Poupitch . |
| 3,316,796 | 5/1967 | Young . |
| 3,935,786 | 2/1976 | Murray et al. .................. 411/29 |
| 3,942,407 | 3/1976 | Mortensen .................. 411/36 |
| 4,007,659 | 2/1977 | Stencel .................. 411/34 |
| 4,617,692 | 10/1986 | Bond et al. .................. 411/387 X |
| 4,875,815 | 10/1989 | Phillips, II .................. 411/55 X |
| 4,984,946 | 1/1991 | Phillips, II .................. 411/55 X |
| 5,183,357 | 2/1993 | Palm .................. 411/29 |

FOREIGN PATENT DOCUMENTS

| | | |
|---|---|---|
| 795407 | 5/1973 | Belgium . |
| 3447415 | 6/1986 | Fed. Rep. of Germany . |
| WO90/05855 | 5/1990 | PCT Int'l Appl. . |

Primary Examiner—Neill R. Wilson
Attorney, Agent, or Firm—Schwartz & Weinrieb

[57] ABSTRACT

The pin comprises an expansion body (2) and, around the body, an expandable tubular sleeve (3) made from a flexible material, with a stop collar (12) and an end (10) forming a nut. With the pin extending through an orifice pierced in the wall with the sleeve collar (12) bearing against the front face of the wall, the nut (10) interacts with an end part of the body, is driven towards the collar (12) and brings about the expansion of the sleeve (3) and its squashing against the rear face of the wall. The body (2) is tubular, in order to receive a screw for fixing a piece upon the wall, and has, unlike the end part, a collar (7) for bearing against the one (12) on the sleeve (3). The sleeve (3) is plastically deformable and means (42) are provided for preventing the rotation of the body (2) with respect to the sleeve (3) in the opposite direction to the direction of expansion. The end of the body (2) is provided with a piercing bit (4).

The pin of the invention can be applied well to bricks.

20 Claims, 8 Drawing Sheets

PIN FOR FIXING A PIECE TO A THIN SUPPORTING WALL

FIELD OF THE INVENTION

The present invention relates to a pin, for fixing a piece to a supporting wall, comprising an expansion body, which is tubular for receiving a screw for fixing the piece and, around the body, an expandable tubular sleeve made from a plastically deformable material, one end of which is provided with a stop collar and the other end of which is arranged, under the action of the driving of the body in rotation in one direction with respect to the sleeve, with the pin extending through an orifice made in the wall with the sleeve collar bearing against the front face of the wall, to interact with an end part of the body, to be driven towards the collar and to bring about the expansion of the sleeve and its squashing against the rear face of the wall and thus the fixing of the pin to the wall, the expansion body having, at the opposite end to the end part which interacts with the sleeve, a collar designed to come to bear against the one on the sleeve.

BACKGROUND OF THE INVENTION

The fixing of piece to relatively thin supporting material, such as for example a thin partition or the external surface of a brick, is carried out in a particular way, not by anchoring in the body of the material, but through the rear of the material, that is to say on the opposite side to the one which supports the piece.

Details of a pin of the type mentioned above are given in the document WO-A-9005855. But fixing a piece with such a pin can be acheived only under constraining conditions, with several tools.

SUMMARY OF THE INVENTION

The present invention aims therefore to improve a pin of the type mentioned above, in order to make easier and speed up its fixing and also to allow it to be fixed in a solid material, even if its primary application remains the fixing of parts to hollow materials.

The present invention therefore relates to a pin of the type mentioned above, characterized in that the end of body, to interact with the sleeve for its expansion and squashing, is provided with a piercing bit.

The fixing of a piece with the pin of the invention, which is a self-drilling pin, is easier than with a pin of the prior art.

With a single tool, a screwdriver, if the piercing is effected by rotation of the pin body and the interaction between the body and the sleeve is effected by threading-tapping, and in a single step, a hole is pierced by the piercing end of the body surrounded by the sleeve and, immediately afterwards, the sleeve undergoes an expansion and squashing against the supporting wall. Once the pin has been fixed to the wall, the piece to be fixed is placed against the collar of the body and, using the same tool, a fixing screw is screwed through the piece and into the body of the pin.

Still, document US-A-4 617 692 teaches also a pin, or more exactly a sleeve, provided with a piercing bit. But this bit is mounted screwed on a threaded shaft of which the object is only the expansion of the sleeve and which has no function by its fixing, since it is taken away thereafter. Moreover, and after expansion, the bit is detached. There was thus no reason to apply the teaching of this document to provide a piercing bit at the end of the body of the pin of document WO-A-9005855.

In an advantageous embodiment of the pin of the invention, a piercing end piece is fitted, preferably detachably, to the piercing end of the body of the pin.

An end piece mounted detachably on the piercing end of the pin body can then be driven out of it, which allows the fixing of the piece by means of a screw even though longer than the body and piece to be fixed combined.

Advantageously again, the piercing end piece is a piece which has been cropped, preferably bevelled, from a piece of sheet metal. It can be ribbed.

It is also preferable for the overall transverse dimension of the end piece to be slightly greater than that of the body, in order to prevent the sleeve, before its use, during storage and handling, from becoming disconnected from the pin body, or even greater than that of the end of the sleeve interacting with the body, to avoid, during fixing, the sleeve sticking in the hole pierced by the end piece and being expanded prematurely.

Advantageously, the piercing bit is a cutting insert arranged to be received in an insert support arranged to be mounted at the piercing end of the pin body. In this embodiment, the pin has been originally transformed in a tool-holder, with, as a tool, the cutting insert.

The interest of this embodiment is to adapt the cutting insert to the nature of the material of the supporting wall. For instance, for a hard material, an insert made of tungsten carbide shall be adopted whereas for a rather soft material, an insert molded in a light metal alloy or even in plastic material should be suitable.

Under these conditions, the applicant wants also to claim the pin, without cutting insert, on the one hand, as well as the insert support, per se, on the other hand.

Thus, the invention also relates to a pin of the above mentioned type, characterized in that the end of the body, to interact with the sleeve for its expansion and squashing, is provided with a cutting insert support.

The invention still relates to an insert support arranged for being mounted at an end of an expanding body of a pin, to interact with a tubular sleeve disposed around the pin body, for fixing a piece to a supporting wall, the sleeve being made from a plastically deformable material, one of its ends being provided with a bearing collar and its other end being arranged, under the action of the driving of the body in rotation in one direction with respect to the sleeve, with the pin extending through an orifice made in the wall with the sleeve collar bearing against the front face of the wall, to interact with an end part of the body, to be driven towards the collar and to bring about the expansion of the sleeve and its squashing against the rear face of the wall and thus the fixing of the pin to the wall, the expansion body having, at the opposite end to the end part which interacts with the sleeve, a collar designed to come to bear against the one on the sleeve.

It is also preferable and more simple for the pin body to be threaded and for the end of the sleeve opposite and its collar to be tapped to form a nut on the body, the threading and tapping being advantageously of the type with a so-called buttress thread.

In this case, the pin body can have an internal bore with a cruciform cross section, extending from one end to the other, allowing it, at the end provided with the collar, to be rotated by a screwdriver and, at the piercing end, allowing the end piece to be mounted by the insertion of a bit shank into two opposite arms of the cruciform bore.

Such a bore shape also affords the fixing screw four anchoring points.

Preferably again, the said means for preventing the rotation of the body comprise, on the body, ribs shouldered on one side and, in the sleeve, grooves for receiving the ribs.

BRIEF DESCRIPTION OF THE DRAWINGS

The invention will be understood better by means of the following description of two embodiments of the pin of the invention, with reference to the accompanying drawings in which like reference characters designate like or corresponding parts throughout the several views, and wherein.

DETAILED DESCRIPTION OF THE ILLUSTRATED EMBODIMENTS

Figure 1:
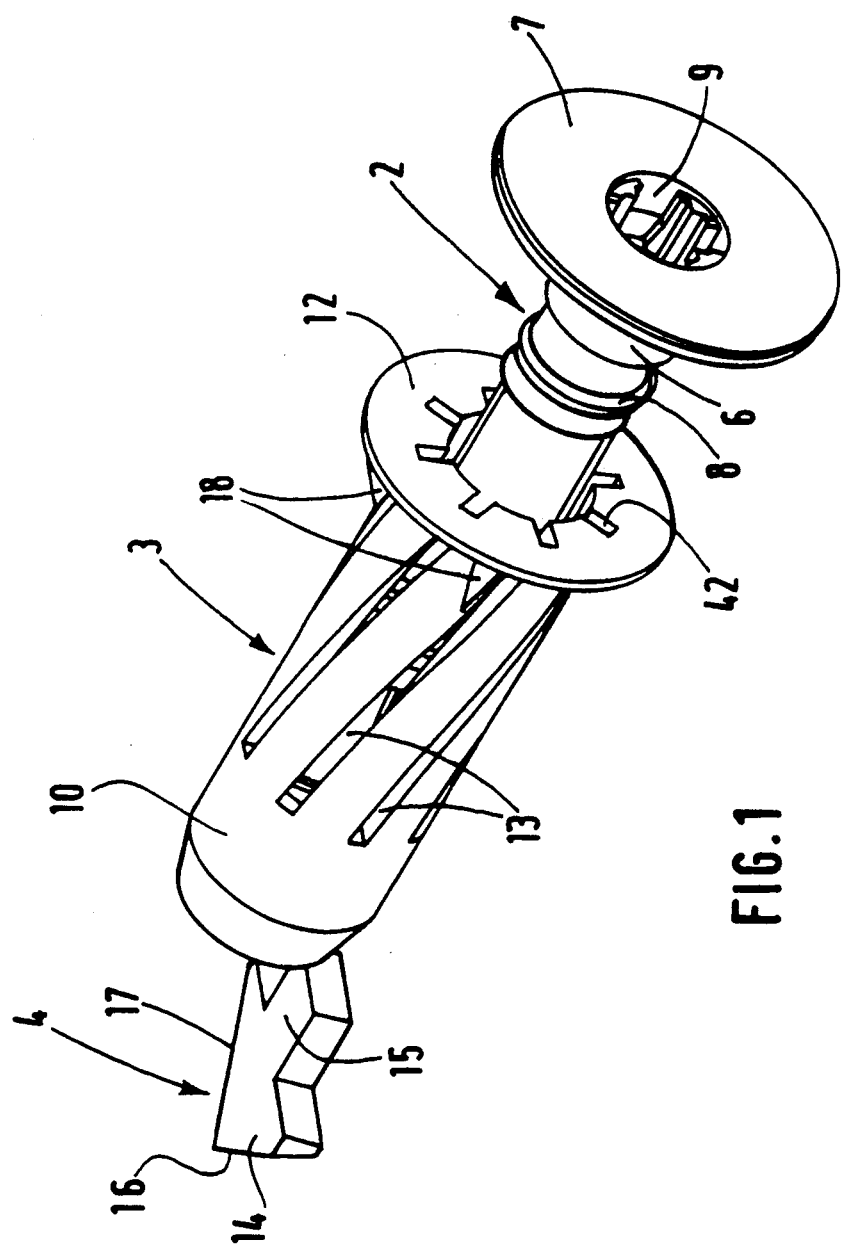
FIG. 1 is a view in perspective of the first embodiment of the pin during assembly, before storage or use.
Figure 2:
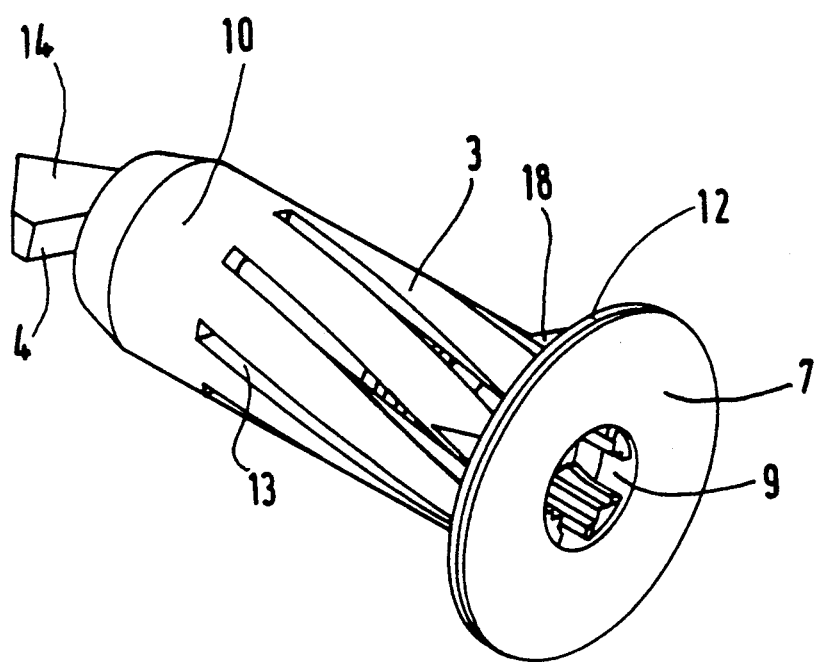
FIG. 2 is a view in perspective of the pin of FIG. 1, once assembled.
Figure 3:
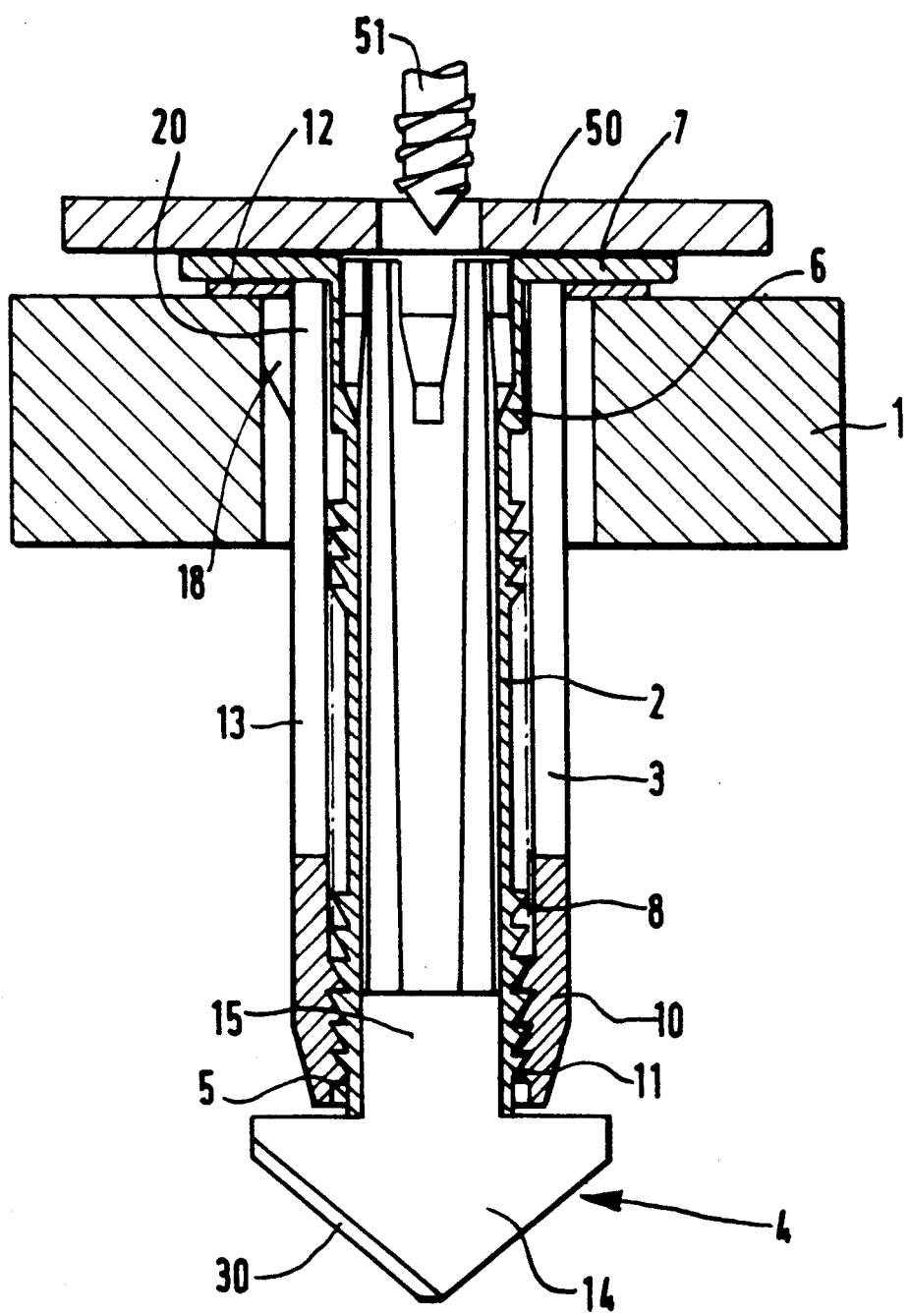
FIG. 3 is a view in axial section of the pin of FIG. 1 before expansion.
Figure 4:
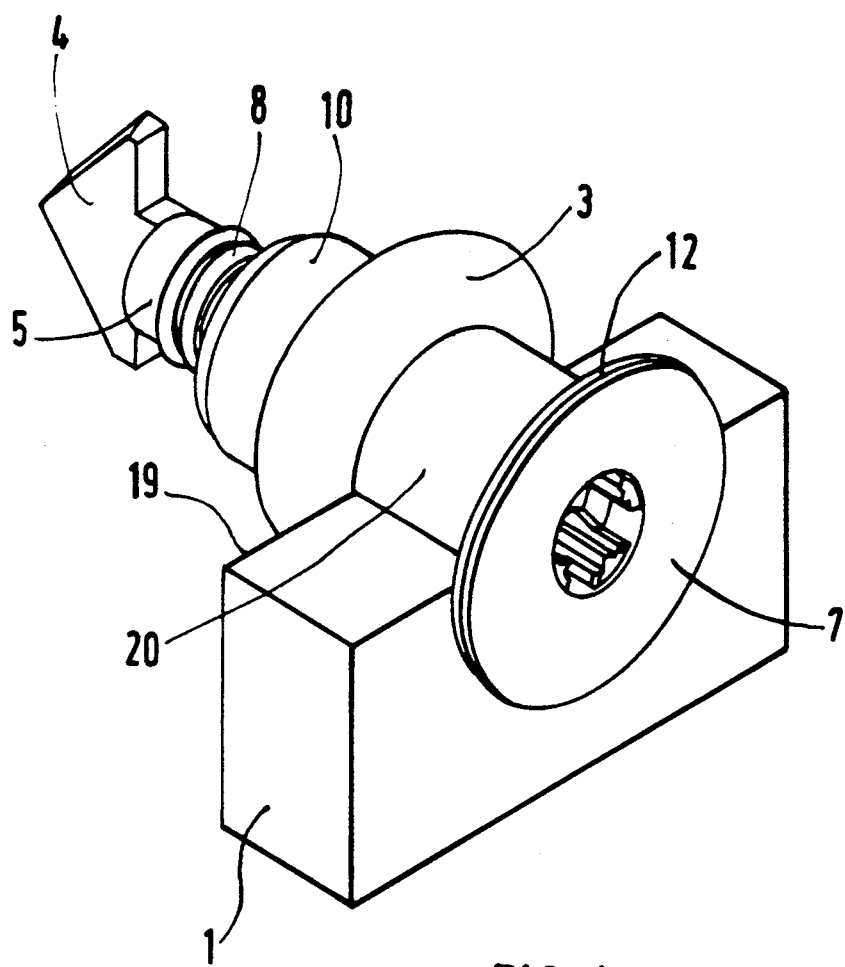
FIG. 4 is a view in perspective of the pin of FIG. 1, after fixing.
Figure 5:
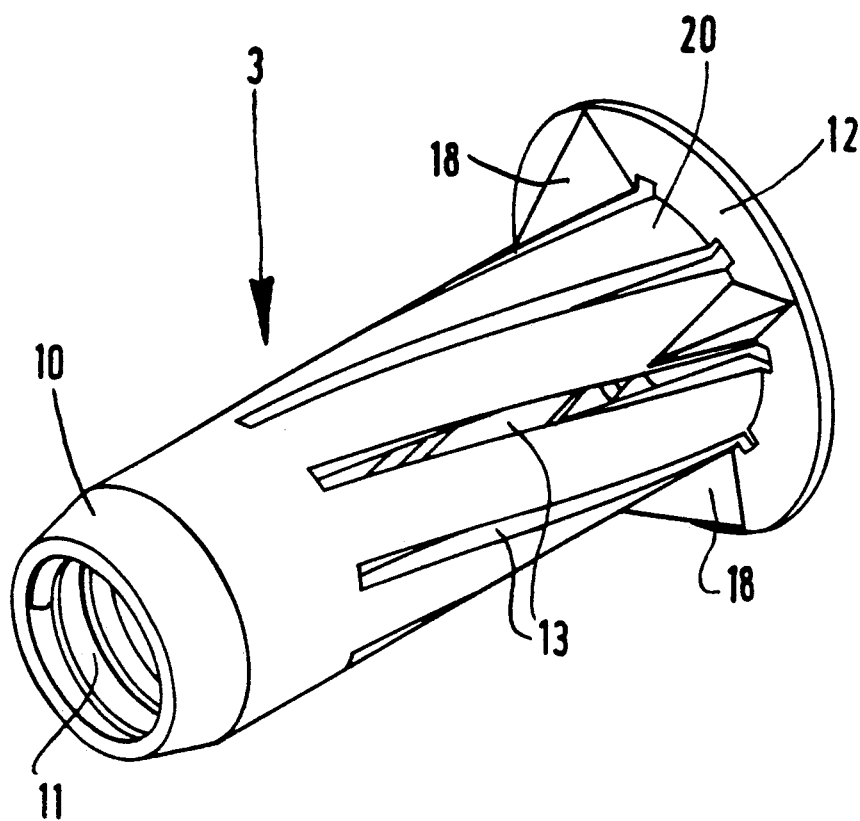
FIG. 5 is a view in perspective of the expandable sleeve of the pin of FIG. 1.

The pin which will now be described with reference to FIGS. 1-7 is particularly designed to fix a piece 50 to a thin supporting wall, such as one constructed from a hollow brick 1 (FIGS. 3 and 4).

The pin has three components: a driving body 2, an expandable sleeve 3 and a piercing bit 4.

In this case this is a self-drilling pin; it could however also be used without its piercing bit.

The pin body 2 is tubular. It has, over a large part of its length, practically from the end 5 designed to receive the piercing bit 4, an external thread 8. The other end 6 of the body is provided with a stop collar 7. The body has an internal bore 9 with a cruciform cross section, extending from the stop collar 7 to the piercing end 5. Close to the stop collar 7, the internal bore 9 can for example be of the "Phillips" or "Posidrive" type.

The expandable sleeve 3 is also tubular so as to be disposed around the body 2. In this case it is made from plastic material. One of its ends 10 has an internal tapping 11, .to interact with the thread 8 on the pin body and to form a nut on the body, the other end 20 of the sleeve being provided with a stop collar 12, against which the collar 7 on the pin body is designed to bear.

The side wall of the sleeve 3 is provided with slots 13 to make it flexible. There is a plurality of slots evenly spaced in this case in planes inclined with respect to the axis of the tubular sleeve in FIG. 1 and passing through the axis in FIG. 3.

The sleeve 3 is provided, on its external wall, in this case against the collar 12, with anti-rotation fins 18.

The piercing bit 4 is a piece cropped from a piece of sheet metal, in the form of a triangular piercing tip 14 extended by a shank 15 to be inserted into two opposite arms of the cruciform bore 9 in the end part 5 of the body 2, thus referred to as the piercing end. The converging edges 16, 17 of the tip 4 are cut in a bevel 30 and spread apart by a distance, corresponding to its overall transverse dimension, which is slightly greater than the external diameter of the end portion 10 of the sleeve 3.

The pin is assembled by fitting, by screwing, the sleeve 3, by means of its end with the collar 12, onto the pin body 2, until the collar 12 comes up against the collar 7 on the body, and then by inserting the bit 4 with light force, by means of the shank 15, into the bore in the end piercing portion 5 of the body, the bit thus being mounted detachably at this piercing end 5.

A piece is secured by means of the pin as follows.

Using a screwdriver, through the cruciform bore 9 of the end part 6, the body 2 is rotated and, with it, the bit 4 with cutting edges 16, 17, which thus pierces a hole in the wall of the material, in this case a brick for receiving the piece to be fixed. When the two collars 7, 12 are disposed against the wall of the brick and the portion 20 of the sleeve 3, adjacent to its collar 12, is resting in the hole which has thus been pierced, but without any longer being able to rotate, because of the fins 18, the rotation, still under the action of the screwdriver, of the body 2 immobilised in axial translation, in the tapped end portion 10 of the sleeve 3, brings about a relative axial movement of the body 2 and that portion 10 of the sleeve 3 which, forming a nut on the threaded body 2, is driven towards the collars 12, 7 to bring about the expansion, or swelling, of the adjacent part of the sleeve, between this tapped portion 10 and the rear face 19 of the wall of the brick, and, thus, its squashing against this rear face and the fixing of the sleeve to the brickwall 1. In FIG. 4, the sleeve 3 has been shown diagrammatically, without its slots for giving flexibility which have been distorted. It then suffices to place the piece to be secured against the collar 7 of the body 2 and, using the same screwdriver, to screw a fixing screw 51 through the piece to be fixed and the bore 9 of the pin body 2 which the screw taps effectively since, in a transverse plane, it is bearing against four points.

It will be noted that if the fixing screw is longer than the pin body 2 and the piece combined, it will without difficulty push out the bit 4 which no longer serves any useful purpose.

It will also be noted that, because of the relative transverse dimensions of the sleeve 3 and the bit 4, and therefore of the pierced hole, the expansion of the sleeve (3) can commence only when its rotation is prevented, with its collar 12 bearing against the supporting wall.

Depending on the nature of the material of the sleeve, the slots for making it flexible may not be necessary.

Figure 6:
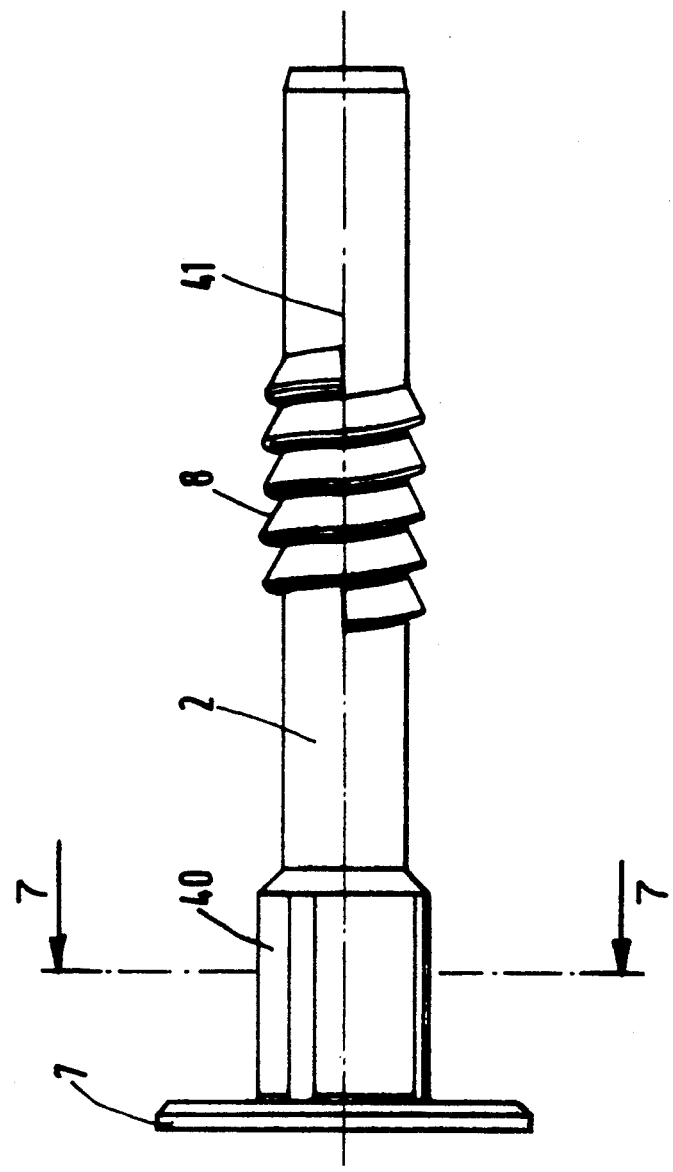
FIG. 6 is a side view of the body of the pin of FIG. 1, alone, with anti-rotation ribs and buttress thread.
Figure 7:
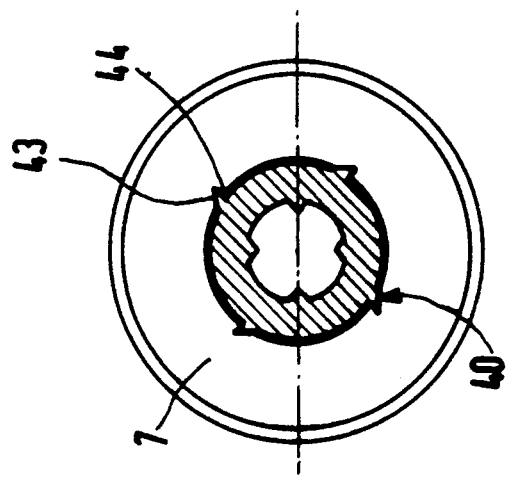
FIG. 7 is a view in cross section of the pin body, along the line 7—7 in FIG. 6.
Figure 8:
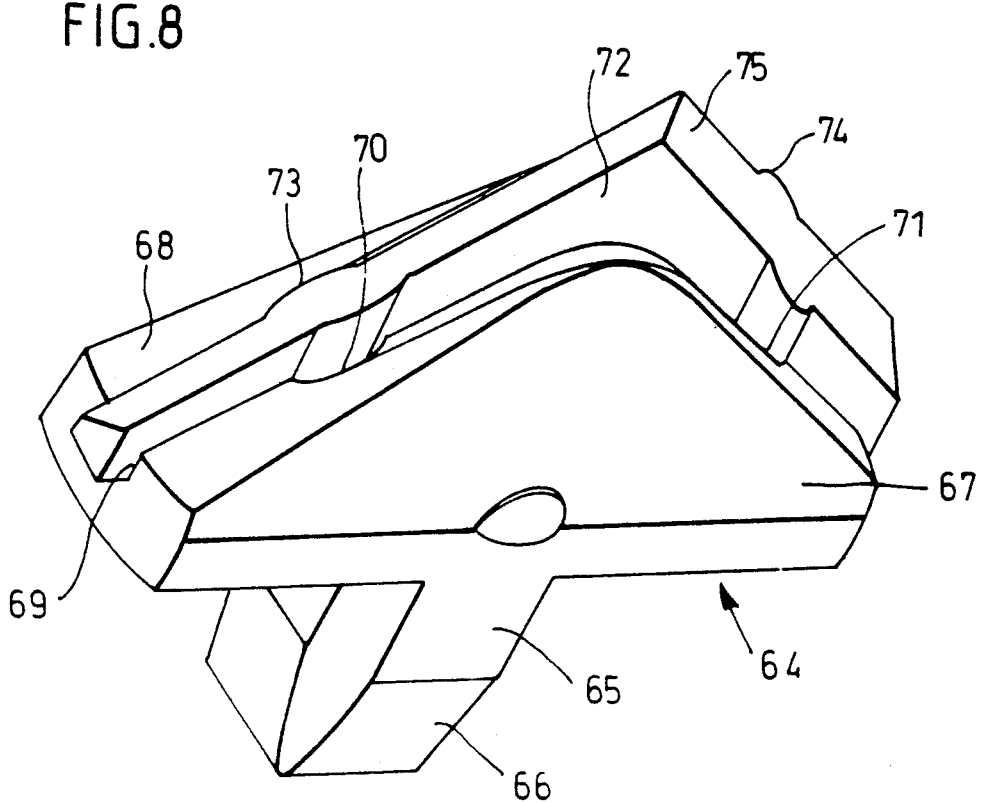
FIG. 8 is a view in perspective of the insert support, with the insert, of the second embodiment of the pin of invention.

With reference to FIGS. 6 and 7, the body 2 of the pin has a buttress thread 8 designed to interact with a corresponding buttress tapping on the sleeve. The advantage of such a configuration is to limit the radial component of the screwing force and therefore the radial expansion of the nut part of the sleeve which could be prejudicial to fixing.

The body 2 of the pin, still with reference to FIGS. 6 and 7, also has, adjacent to its stop collar 7, antirotation ribs 40 running parallel to the axis 41 of the body. These ribs 40 are intended to engage in grooves 42 provided, from its collar, in the sleeve (FIG. 1) and prevent any unscrewing of the body 2 in the sleeve should the piece fixing screw be unscrewed in the body. The ribs 40 have, on one side, a slope 43, which does not prevent the screwing of the body in the sleeve, without for all that bringing about the expansion of the sleeve, and, on the other side, a shoulder 44 to come up against a corresponding groove wall 42 in the sleeve and prevent any unscrewing of the body.

Figure 9:
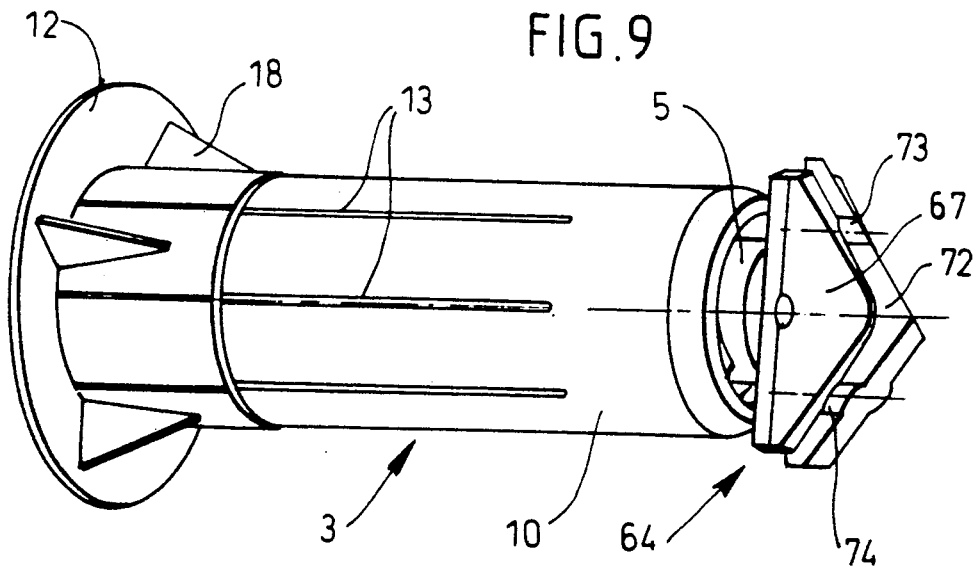
FIG. 9 is a view in perspective of the second embodiment of pin of the invention, with its insert support and its insert
Figure 10:
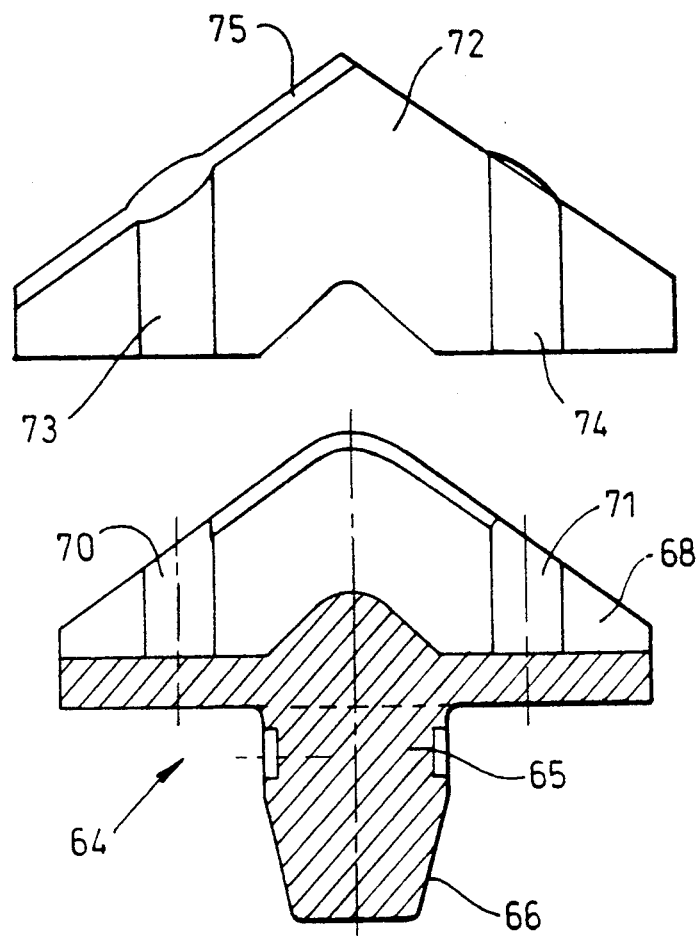
FIG. 10 is an exploded view, partially in section, of the insert support end of the insert of the pin of FIG. 9.

The pin of FIG. 9, its piercing parts excluded, is identical to the pin of the other figures. Its driving body and its expandable sleeve are identical. Only the piercing means are different, a bit, in the first case, an insert support and a cutting insert, in the second case. Under these conditions, same elements shall be referenced by same numbers.

The pin body 2, whose piercing end 5 appears on FIG. 9, receives an insert support 64. The support 64 has a fitting shank 65, having a parallelepipedic general shape, and slightly beveled (66) to make fitting into the end part of the inner bore of the pin body 2 easier. The end portion of the inner bore of the body 2 could eventually be shaped roughly in correspondance.

The shank 65 is extended by two lips 67, 68 which are parallel and form therebetween a groove 69 for receiving an insert. The lips 67, 68 are in the form of a triangular tip. Internally, they include, each, a pair of grooves 70, 71 for receiving insert ribs in order to assure centering and holding of the insert.

The cutting insert 72 has a shape complementary to that of lips 67, 68 of the insert support 64. In the form of a triangular tip, with a double cutting edge 75, it comprises, on each side, a pair of ribs 73, 74 to cooperate with the corresponding grooves 70, 71 of the lips 67, 68 of the support.

The pin of FIG. 9, as far as body and sleeve are concerned, is assembled the same way as before. As far as the insert support 64 and the insert 72 are concerned, shank 65 is detachably inserted with light force into the bore of the piercing end portion of the body and then, the insert 72, also with light force and detachably, into the support 64.

With regard to the fixing of a piece, it is acheived with the pin of FIG. 9 the same way as with the pin of FIGS. 1-7.

The interest of this last pin is to make possible to use a cutting insert suitable to the material to be pierced.

For a hard material, such as brick or earthware, an insert made of tungsten carbide should be chosen. For a material not so hard, an insert molded in a light metal alloy or even in plastics could be chosen.

The pin of FIG. 9 shall be for sale, all assembled, but it should not be excluded to ship it, either naked, without insert support nor insert, or, preferably, only provided with its insert support, thus as a tool-holder, the end user having just to adapt thereon the suitable insert.

Obviously, many modifications and variations of the present invention are possible in light of the above teachings. It is therefore to be understood that within the scope of the appended claims, the present invention may be practiced otherwise than as specifically described herein.

We claim:

1. A pin assembly for fixedly mounting a component upon a supporting wall, comprising:

a tubular body having external thread means defined thereon, a collar at one end thereof for supporting said component to be affixed upon said supporting wall, and a second opposite end which defines a recess means;

an expandable tubular sleeve disposed about said tubular body and having a threaded nut portion defined upon one end thereof for threaded engagement with said thread means of said tubular body such that upon relative threaded rotation of said tubular body such that upon relative threaded rotation of said tubular body with respect to said tubular sleeve, said nut portion of said tubular sleeve will axially translate along said tubular body and cause radially outward expansion of said tubular sleeve so as to engage a first surface portion of said supporting wall, said tubular sleeve having a collar defined upon a second opposite end thereof for engaging a second surface portion of said supporting wall and for supporting said collar of said tubular body;

a piercing bit disposed within said recess means of said tubular body for cutting a hole, within said supporting wall, through which said tubular body and said tubular sleeve extend so as to permit, while said collar of said tubular sleeve is disposed in contact with said second surface of said supporting wall and said collar of said tubular body is disposed in contact with said collar of said tubular sleeve, said tubular sleeve to expand radially outwardly as a result of said relative threaded rotation of said tubular body with respect to said tubular sleeve; and means defined upon said tubular body for receiving a tool for imparting rotation to said tubular body and said tubular sleeve so as to initially cause said piercing bit, disposed within said recess means of said tubular body, to cut said hole within said supporting wall and to subsequently cause said relative threaded rotation of said tubular body with respect to said tubular sleeve in order to achieve said axial translation of said nut portion of said tubular sleeve along said tubular body and said radially outward expansion of said tubular sleeve.

2. An assembly as set forth in claim 1, wherein:
said piercing bit is detachably mounted within said recess means of said tubular body.

3. An assembly as set forth in claim 2, further comprising:
a screw means axially disposed within said tubular body and for engaging said component so as to fix said component relative to said supporting wall.

4. An assembly as set forth in claim 3, wherein:
said tubular body has a predetermined axial length defined between said collar and said recess means; and
said screw means has an axial length which is greater than said predetermined axial length of said tubular body such that an end portion of said screw means, disposed opposite an end portion thereof which engages said component, causes detachment of said piercing bit from said recess means of said tubular body when said screw means is fully seated within said tubular body in order to fix said component with respect to said supporting wall.

5. An assembly as set forth in claim 14, wherein:
said piercing bit has a transverse dimension which is greater than a corresponding transverse dimension of said tubular sleeve so as to permit said tubular body and said tubular sleeve to be inserted through said hole defined within said supporting wall by said piercing bit.

6. An assembly as set forth in claim 14, wherein:
said piercing bit comprises a bevelled head having a substantially triangular configuration, and a shank portion integral therewith for disposition within said recess means of said tubular body.

7. An assembly as set forth in claim 19, wherein:
said piercing bit is fabricated from a metal alloy.

8. An assembly as set forth in claim 19, wherein:
said piercing bit is fabricated from tungsten carbide.

9. An assembly as set forth in claim 19, wherein:
said piercing bit is fabricated from a plastic material.

10. An assembly as set forth in claim 14, further comprising:
an insert support disposed within said recess means of said tubular body; and
said piercing bit comprises a cutting insert removably disposed within said insert support.

11. An assembly as set forth in claim 14, further comprising:
means defined between said tubular body and said tubular sleeve for preventing rotation of said tubular body relative to said tubular sleeve in a direction opposite the direction of rotation of said tubular body relative to said tubular sleeve which causes said axial translation of said nut portion of said tubular sleeve along said tubular body and said consequent radially outward expansion of said tubular sleeve.

12. An assembly as set forth in claim 11, wherein said means for preventing relative rotation of said tubular body with respect to said tubular sleeve comprises:
shouldered rib means defined upon said tubular body; and
groove means defined upon said tubular sleeve for receiving said shouldered rib means of said tubular body.

13. An assembly as set forth in claim 1, further comprising:
means defined upon external peripheral portions of said tubular sleeve disposed within the vicinity of said collar of said tubular sleeve for preventing rotation of said tubular sleeve relative to sidewall portions of said supporting wall defining said hole cut within said supporting wall by said piercing bit.

14. An assembly as set forth in claim 6, wherein:
said tubular body has an internal bore having a substantially cruciform configuration extending from said collar of said tubular body to said recess means of said tubular body wherein within said collar end of said tubular body, said cruciform-configured internal bore comprises said means for receiving a screwdriver tool, while within said recess means end of said tubular body, said cruciform-configured internal bore can house said shank portion of said 15. An assembly as set forth in claim 1, wherein:
said tubular sleeve comprises a plastically deformable member which comprises a plurality of substantially axially extending slots for facilitating said radially outward expansion of said tubular sleeve.

16. An assembly as set forth in claim 10, further comprising:
groove means defined within said insert support; and
rib means defined upon said cutting insert for disposition within said groove means of said insert support for insuring proper seating of said cutting insert within said insert support.

17. An assembly as set forth in claim 10, wherein:
said insert support has a substantially triangular configuration comprising two parallel wall portions defining a slot-type groove therebetween; and
said cutting insert has a substantially triangular configuration and is disposed within said slot-type groove of said insert support.

18. An assembly as set forth in claim 10, wherein:
said cutting insert is fabricated from a metal alloy.

19. An assembly as set forth in claim 10, wherein:
said cutting insert is fabricated from a plastic material.

20. An assembly as set forth in claim 10, wherein:
said cutting insert is fabricated from tungsten carbide.

* * * * *